UNITED STATES PATENT OFFICE.

RICHARD VITERBO, OF NEW ORLEANS, LOUISIANA.

PURIFYING, CLARIFYING, AND DISCOLORING SACCHARINE LIQUIDS.

SPECIFICATION forming part of Letters Patent No. 364,615, dated June 7, 1887.

Application filed November 8, 1884. Serial No. 147,429. (No specimens.)

*To all whom it may concern:*

Be it known that I, RICHARD VITERBO, a subject of the King of Italy, residing at New Orleans, in the parish of Orleans and State of Louisiana, have invented certain new and useful Improvements in Purifying, Clarifying, and Discoloring Saccharine Liquids, of which the following is a specification.

This invention relates to certain improvements in the clarification and discoloration of sirups and cane, beet, and other juices of a saccharine nature.

Heretofore numerous efforts have been made to secure the clarification and discoloration of saccharine juices; but the methods used have usually been complex, and the materials employed in such connection have been various, costly, and of somewhat extended combinations. In some instances lime-water, sulphate of zinc and water, or precipitated oxide of zinc, prepared by adding lime-water or lime in substance to a solution of sulphate of zinc, is used. Others have used sulphureted hydrogen gas, alumina, oxalate of alumina, yellow prussiate of potash, oxalic acid, alum, and other metallic salts, while sulphur gas, sulphurous-acid gas, carbonic-acid gas, carbonate of alumina, and similar alkalies, with impelled currents of air, have also been employed.

Practical experience in the present costly and cumbersome methods employed to secure the desired clarification and discoloration of saccharine juices induced me to experiment with a view to simplifying and improving this art, and I have discovered that the desired end can be attained and the juices thoroughly purified, clarified, and discolored by simply generating hydrogen gas either directly in the body of the saccharine juice or sirup to be purified and clarified or generating such gas exteriorly of the juice or sirup and then admitting such gas thereto.

The apparatus employed by me may be of the ordinary character employed in the manufacture of candles, except that cast-iron or any other suitable metal or material may be used in its construction, instead of the more costly copper, an open tank or vat—such as is used in the ordinary defecating and evaporating processes—with any of the known means for stirring and agitating the mass therein, being all that is necessary in the conduct of my process or method.

The sirup or juice to be purified and clarified having been placed in an open vat, tank, or other suitable receptacle, I supply to such juice a sufficient quantity of hydrogen gas, the amount of the quantity of gas employed differing in individual cases, some grades of sugar and sirup requiring more gas than other grades to secure the needed purification, this supply being secured in any way, as found most convenient or desirable in individual cases. For instance, the gas may be generated in any of the ordinary methods exteriorly of the vessel within which the sirup or juice to be treated is contained, and conveyed to such vessel by a pipe or pipes; or the gas may be generated in any suitable manner within the vessel containing the sirup or saccharine juice. Both of these methods I have found equally effective, and either may be employed at will without departing from my invention, which consists, essentially, in adding hydrogen gas to saccharine liquids or sirups and intimately mixing the same together.

During the supply, and after the hydrogen gas has been supplied to the sirup, the mass is thoroughly stirred together, and such stirring is continued until defecation is reached, when the impurities are permitted to settle, and the purified sirup is then drawn or poured off into suitable receptacles.

Having thus described my invention, what I claim therein is—

1. The improvement in the art of purifying, clarifying, and discoloring saccharine liquids herein described, consisting in intimately mixing hydrogen gas therewith, substantially as set forth.

2. The improvement in the art of purifying, clarifying, and discoloring saccharine liquids herein described, consisting in adding thereto and mixing therewith hydrogen gas, then stirring and intimately mixing the sirup and gas together, and finally allowing the impurities to settle, and then decanting the purified sirup, substantially as set forth.

In testimony whereof I affix my signature in presence of two witnesses.

RICHARD VITERBO.

Witnesses:
GRANT CARULLER,
FRED EYLE.